Nov. 23, 1965    L. C. FRAZIER    3,219,510
TIRE BUILDING APPARATUS
Filed May 24, 1962    7 Sheets-Sheet 1

INVENTOR.
Larry C. Frazier,
BY Brown, Jackson,
Boettcher & Dienner
Atty's

Nov. 23, 1965  L. C. FRAZIER  3,219,510
TIRE BUILDING APPARATUS
Filed May 24, 1962  7 Sheets-Sheet 2

INVENTOR.
Larry C. Frazier,
BY
Attys.

Nov. 23, 1965 L. C. FRAZIER 3,219,510
TIRE BUILDING APPARATUS
Filed May 24, 1962 7 Sheets-Sheet 4

INVENTOR.
Larry C. Frazier,
BY
Atty's.

United States Patent Office 3,219,510
Patented Nov. 23, 1965

3,219,510
TIRE BUILDING APPARATUS
Larry C. Frazier, Prescott, Ariz., assignor to National-Standard Company, Niles, Mich., a corporation of Delaware
Filed May 24, 1962, Ser. No. 197,397
12 Claims. (Cl. 156—403)

The present invention relates to apparatus for building pneumatic tires. More specifically, the invention relates to apparatus for automatically positioning a cylindrically formed band of tire fabric and a pair of bead rings on an expandable tire building drum or bag, constructing a tire from said band by expanding the same outwardly into a tread element, and automatically removing the finished tire from the building drum.

In accordance with known practice, it is common to construct a pneumatic tire over an expansible cylindrical drum by assembling on the drum the usual tire components comprising the tire beads, tread breaker strips, side walls, chafing strips, tread and other desired components, whereby after the carcass is completed thereon the drum is deflated and the carcass band removed for shaping and curing. The latter operation comprises expanding the carcass band, including the tread, into an annular tire shape and holding the same in a mold during a curing operation.

In my U.S. Patent 2,986,196, issued May 30, 1961, which is assigned to the assignee of the present invention, there is described an improved tire building machine comprising a drum assembly which is mounted in cantilever fashion and presents a cylindrical surface on which a tire carcass may be formed. In the operation of the apparatus described in the above U.S. patent, the desired tire components are applied to the drum, a band of tire fabric being first constructed on the drum, and then a pair of inextensible bead rings being applied in predetermined axially spaced relation so as to encircle the band.

The drum consists of an inflatable building bag which, when inflated, is confined by the bead rings at preselected areas so as to expand different sections of a tire carcass to distinctly different diameters and thereby to turn or flip fabric tightly about the inextensible bead rings. In other words, the expansion of the tire building bag produces an intermediate annular torus section and two annular sections one at each end of the intermediate section separated by the pair of bead rings, whereby the carcass fabric is automatically folded about the bead rings and the latter are thus anchored in the carcass. For a more complete description of the structure and operation of the inflatable tire building bag or drum referred to herein, reference is made to the above-identified patent.

The present invention is particularly adapted for use in conjunction with the above-mentioned tire building drum, and certain aspects of the invention comprise improvements on the apparatus described in my earlier patent for use in conjunction with such an inflatable tire building bag. Other aspects of the present invention relate to apparatus for automatically performing operations which have heretofore been performed manually when manufacturing tires by means of an inflatable building bag. However, the present invention also has general utility in the tire making art as a means for automatically positioning a cylindrically formed band of tire fabric on an expandable tire building drum or the like.

As stated above regarding the operation of the tire building machine described in my U.S. Patent 2,986,196, a band comprising the desired layers of carcass fabric is applied to the tire building bag or drum, a pair of bead rings are then positioned over the drum so as to encircle the band, and the drum is then expanded. The present invention relates in part to a band applier member including a plurality of circumferentially spaced steel fins mounted on a common support at one end and free at their opposite ends, the steel fins being movable radially between expanded and relaxed positions.

In the operation of the band applier member of the present invention, it is first necessary to wrap a band of tire fabric about the several steel fins, or apply thereto an endless cylinder of tire fabric, for example as disclosed in the copending application of Leonard G. Berquist, Serial No. 604,880, owned by the assignee of the present invention, and thereafter to apply a pair of bead rings over the band or endless cylinder in predetermined axially spaced relation and seal the bead rings to the band, after which the band applier is telescoped over an expansible drum or tire building bag, such as described in the above-mentioned patent, in order to deposit the cylindrically formed band and bead ring assembly on the drum. The band applier is then removed and the drum is expanded to form a tire, as will be described more fully hereinafter. In my copending application, Serial No. 197,480, filed of even date herewith, there is described apparatus for automatically applying or building a band of tire fabric on a mandrel such as the band applier of the present invention. Apparatus for placing a pair of bead rings over a cylindrically formed band and sealing the beads thereto is described in my copending application Serial No. 197,504, also owned by the present assignee and filed of even date herewith.

An object of the present invention is to provide in combination a band applier assembly which is rotatable about a generally vertical axis, together with band building apparatus, bead placing apparatus, and a tire building drum, whereby the band applier assembly may first be rotated into alignment with the band building and bead placing apparatus, and after application of a band and a pair of bead rings thereto, it may be rotated into alignment with the building drum so as to be adapted to transfer the band and bead ring assembly to the drum.

Another object of the invention is to provide a band applier member on which a band and bead ring assembly may be constructed or assembled and which is adapted to be telescoped over a tire building drum to transfer a cylindrically formed band of tire fabric to the drum.

A further object of the invention is to provide a band applier member of the type last above-mentioned which is also adapted to remove a finished tire from a tire building drum.

Still another of my objects is to provide a band applier comprising a plurality of circumferentially spaced fins adapted to be moved radially to expanded positions to grip a fabric band positioned thereon, and to relaxed positions to permit the removal of a band therefrom.

A further object of the invention is to provide band positioning means for controlling the axial position of a band which is transferred to a tire building drum, the positioning means being automatically retracted upon expansion of the building drum.

An additional object of the invention is to provide in combination a band applier of the type mentioned above and a pusher ring assembly which cooperate in such a manner that when the band applier is telescoped over a tire building drum to deposit a fabric band on the drum, the pusher ring assembly will be secured to the end of the drum for cooperation with the latter in the formation of a tire, and when the band applier is subsequently telescoped over the building drum to remove a finished tire therefrom, the pusher ring assembly will also be removed from the drum.

A still further object of the invention is to provide a tread retainer which facilitates the insertion of a tread element therein and permits a completed tire to be readily withdrawn therefrom automatically.

Another object of the invention is to provide means for controlling the position of a tread carriage during a tire making cycle, including improved means for maintaining the tread centered with respect to a tire building drum or bag during inflation of the latter.

The foregoing and other objects and advantages of the invention will be apparent from the following description thereof.

Now, in order to acquaint those skilled in the art with the manner of utilizing and practicing my invention, I shall describe, in conjunction with the accompanying drawings, certain preferred embodiments of my invention.

In the drawings:

FIGURE 122 is an enlarged side elevational view of a tread carrier assembly which forms a part of the present invention;

Figures 1, 2, 25, 26:
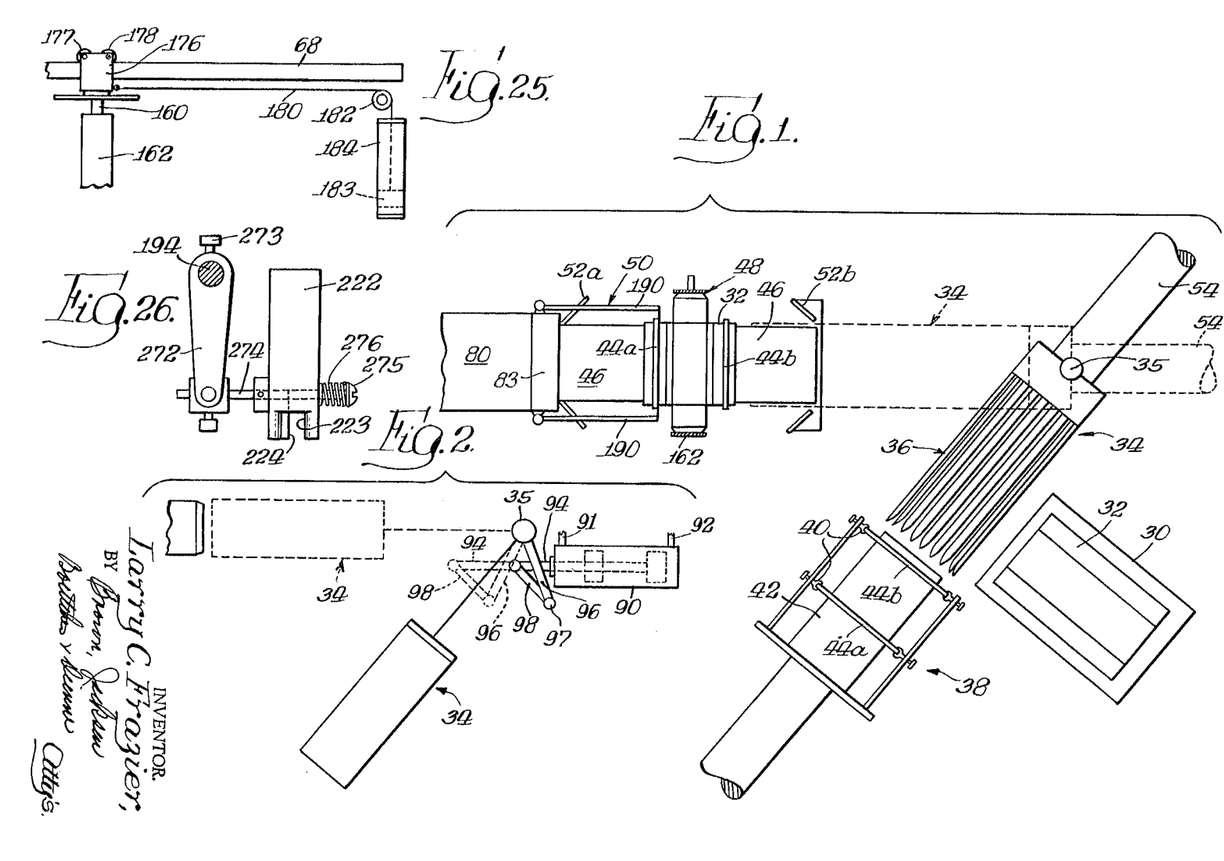
FIGURE 1 is a plan view, generally schematic in form, showing the band applier member together with band building apparatus, bead placing apparatus, a tire building bag, and certain other apparatus with which the band applier may be used to advantage in the manufacture of pneumatic tires.
FIGURE 2 is a partially schematic plan view of mechanism rotating the band applier member of FIGURE 1 between the position shown in solid lines wherein it is aligned with bead placing apparatus, and the position shown in dash lines wherein it is aligned with a tire building bag or drum.
FIGURE 25 is a reduced partially schematic side elevational view showing a weight and cable return mechanism for a tread carriage member.
FIGURE 26 is an enlarged side elevational view of a rack catcher and release mechanism adapted to cooperate with one of the racks shown in FIGURE 10.

Referring now to FIGURE 1, there is shown a ply applicator or band builder 30 having a tire fabric ply 32 positioned flat thereon. A band applier 34 is pivotally mounted at 35 for rotational movement in a horizontal plane between the position shown in solid lines and the position shown in dash lines. The band applier 34 comprises a plurality of circumferentially spaced steel fins or the like 36 which form a drum-like structure about which the tire fabric 32 is wrapped, after which the fabric is spliced to form a cylindrical band. The band builder 30 for applying the ply to the band applier 34 is fully described in my above-mentioned copending application Serial No. 197,480. In lieu of utilizing band builder 30, an endless cylinder of tire fabric, as disclosed in the aforementioned application of Leonard G. Berquist, may be assembled over the steel fins 36 of band applier 34.

Once a cylindrical band of fabric 32 is formed about the steel fins 36, the net step in the tire making cycle being described is to place a pair of bead rings over the band. A bead placing and sealing member is indicated generally at 38 and comprises a pair of bead holding members 40 and an inflatable bag 42. A pair of bead rings 44a and 44b are shown positioned in the bead holding members. In operation, the bead placing and sealing apparatus 38 is moved axially toward the band applier 34 until the bead rings 44a and 44b encircle a cylindrical fabric band 32 previously formed on the applier, and the inflatable bag 42 is positioned inside the steel fins 36, after which the bag 42 is inflated so as to expand the steel fins and the band radially outwardly against the beads to effect a seal between the beads and the band. The bag 42 is then deflated, the bead holding members are moved to open positions to release the beads, and the bead placing apparatus is returned to the position shown in FIGURE 1. The structure and operation of the bead placing and sealing apparatus 38 is described in detail in my above-mentioned copending application Serial No. 197,504.

FIGURE 1 further shows an inflatable tire building bag 46, a tread carriage 48, a band positioner 50, and a pair of pusher rings assemblies 52a and 52b. When the band and bead rings are properly positioned on the applier 34, the later is rotated to the position shown in dotted lines and then moved axially toward the tire building bag 46, whereby the steel fins 36 are telescoped over the building bag so as to deposit the band and bead ring assembly on the bag, after which the applier 34 is moved axially away from the bag. A band 32 and a pair of bead rings 44a and 44b are shown in position on the building bag 46. When the band 32 and bead rings 44a and 44b are properly positioned on the building bag 46, the bag is inflated so as to expand the same radially outwardly into a tire tread held by the tread carrier 48, and also to turn or flip fabric tightly about the inextensible bead rings. The latter operation is described in my above-mentioned U.S. Patent 2,986,196.

The band applier member 34 and the other related apparatus which form a part of the present invention will now be described in detail, and certain stages of the above-mentioned tire building cycle will also be described hereinbelow in a more complete manner where relevant to the invention.

Figure 3:
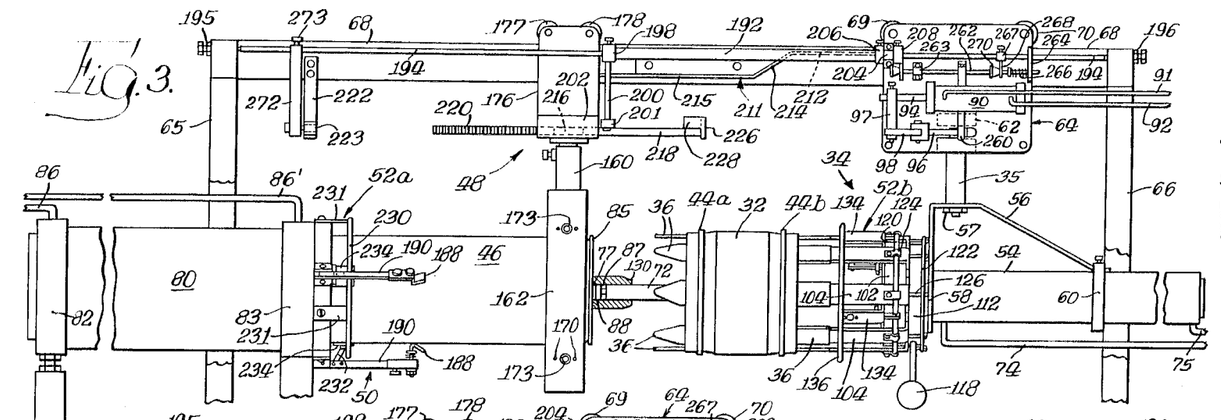
FIGURE 3 is a side elevational view of a tire building machine embodying the present invention, the band applier member having a band of tire fabric and a pair of bead rings mounted thereon, and being shown in alignment with an inflatable tire building bag preparatory to being telescoped over the bag to deposit the band and bead ring assembly thereon.

FIGURE 3 shows the band applier member 34 and the plurality of circumferentially spaced steel fins 36 which form a part thereof. The band applier 34 is shown in axial alignment with the tire building bag 46, and is thus in a position corresponding to the position shown schematically in dash lines in FIGURE 1. The band applier assembly 34 includes a cylinder 54 and the assembly is supported from a shaft 35 by means of a bracket 56 which is secured to the bottom of the shaft by a nut 57 and which embraces the cylinder 54 at spaced points along the axis thereof as at 58 and 60 in order to support the latter.

The upper end of the shaft 35 is provided with a bearing 62 whereby it is suspended from a carriage 64 in such a manner that it may be rotated about its own axis. A pair of fixed upright supports are shown at 65 and 66 and the upper ends of these supports are spanned by a cross beam or rail 68. The carriage 64 is provided with a pair of rollers 69 and 70 which are adapted to roll along the top of the rail 68, and in this manner the band applier 34 is suspended from the fixed supporting rail 68 and is movable axially along the rail toward and away from the tire building bag 46.

Still referring to FIGURE 3, a piston rod 72 having a piston (not shown) mounted on one end is positioned within the cylinder 54, and when the rod 72 is held in a fixed position, the cylinder 54 is moved axially along the rod by conducting fluid under pressure through a selected one of two fluid conduits 74 and 75 which communicate with the cylinder. The piston rod 72, which forms one component of the band applier 34, is adapted to be axially secured to the end of a piston rod 77 which forms a component of the tire forming apparatus and functions to effect axial contraction and expansion of the tire building bag 46.

The tire forming apparatus comprises a cylinder 80 which is mounted by a pair of axially spaced supporting structures 82 and 83. The piston rod 77 is mounted within the fixed cylinder 80 for axial sliding movement relative thereto, and a plate 85 is carried on the outer end of the rod. The inflatable tire building bag 46 has one end sealed to the fixed supporting structure of cylinder head 83 and its other end sealed to the movable end plate or ring 85, whereby as the rod 77 is moved into the cylinder 80 (to the left in FIGURE 3) the bag 46 will be contracted, and as the rod 77 is moved in the opposite direction the bag will be returned to the extended position shown in FIGURE 3. Fluid conduits 86 and 86' are connected to the cylinder 80 for controlling the axial movement of the piston rod 77.

Figure 8:
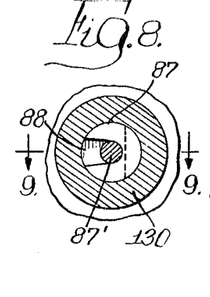
FIGURE 8 is an enlarged verticle section taken substantially along the line 8—8 of FIGURE 7 showing the manner in which one component of the band applier member is axially secured to the tire building bag assembly when the band applier is rotated into alignment with the building bag.

The outer end of the piston rod 77 comprises a keeper member 87 (shown best in FIGURES 8 and 9), and the outer end of the piston rod 72 is provided with a rod 87' which carries a corresponding anchor 88, whereby when the band applier 34 is swung into axial alignment with the tire building bag 46, the anchor 88 fits into the keeper 87. In this manner, the rod 72 is axially secured to the rod 77, although the band applier 34 remains free to swing out to the position shown in solid lines in FIGURE 1 when mechanism for effecting such movement is actuated, which mechanism will now be described.

Referring to FIGURES 2 and 3, there is shown a cylinder 90 having fluid inlet and outlet conduits 91 and 92 communicating therewith. The cylinder 90 is fixedly mounted on the carriage 64, and a piston rod 94 is housed within the cylinder for axial sliding movement relative thereto upon conduction of fluid under pressure to the cylinder through a selected one of the conduits 91 and 92. The shaft 35 from which the band applier 34 is suspended has a crank arm 96 fixed thereto, and the piston rod 94 is connected to the crank through linkage members 97 and 98.

When fluid under pressure is conducted to cylinder 90 through conduit 92, the rod 94 is moved outwardly relative to the cylinder (to the left as shown in FIGURE 2) so as to move the various linkage members to the positions shown in dash lines in FIGURE 2, thus rotating the shaft 35 in a clockwise direction. In this manner, the band applier is moved to the position shown schematically in dash lines in FIGURE 2 wherein it is in axial alignment with the tire building bag 46, and the anchor 88 is seated in the keeper 87. On the other hand, when fluid under pressure is conducted to the cylinder 90 through the conduit 91, the rod 94 is moved to the right thus rotating the shaft 35 in the counterclockwise direction so as to swing the band applier 34 away from the building bag 46 to a position such as shown in solid lines in FIGURES 1 and 2 wherein it is in alignment with the bead placing apparatus 38, and also in a position to cooperate with the band builder 30.

It will now be understood that after the band 32 and the pair of bead rings 44a and 44b are assembled on the steel fins 36, the band applier is swung into alignment with the building bag 46 whereby, through the cooperation between the anchor 88 and the keeper 87, the rod 72 is axially secured to the rod 77. In this manner, the piston rod 72 is prevented from moving axially relative to the piston rod 77, and thus by conducting fluid under pressure to the cylinder 54 through conduit 75, the cylinder 54 will be moved axially toward the building bag 46 while the rod 72 remains stationary. It should be noted that when the cylinder 54 is thus moved to the left as viewed in FIGURE 3, the band applier assembly 34 moves therewith, including the steel fins 36, and also including the carriage 64 which is caused to roll along the rail 68. It is in this manner that the band applier is telescoped over the building bag 46 to transfer a band and bead assembly thereto, as will be more fully described hereinafter.

It has been stated earlier herein that the steel fins 36 are movable radially to expanded and relaxed positions. The mechanism for controlling the position of the fins will now be described, and in conjunction therewith I will describe the manner in which the pusher ring assembly 52b is adapted to be locked to the band applier when the fins 36 are moved to their expanded positions, and to be released from the band applier when the fins are moved to their relaxed or radially inner positions.

Regarding the pusher rings 52a and 52b, it was noted earlier herein that when the tire building bag 46 is inflated to form a tire, it acts upon the fabric ply 32 to form an intermediate annular torus section and two annular sections one at each end of the intermediate section separated by the pair of bead rings, whereby the carcass fabric is folded about the bead rings and the latter are thus anchored in the carcass. It should be understood that during this operation one of the pusher rings is moved axially toward the other so as to press the inflated end sections of the building bag toward one another and against the intermediate section with sufficient pressure to insure proper sealing contact of the component parts of the carcass side walls, and thus seal and wrap the end portions of the ply tightly around the bead rings, as is more fully explained in my U.S. Patent 2,986,196. Having thus briefly explained the function of the pusher rings 52a and 52b, the mechanism for operating the fins 36 and for locking and releasing the pusher ring 52b will now be described.

Figures 19, 20, 21:
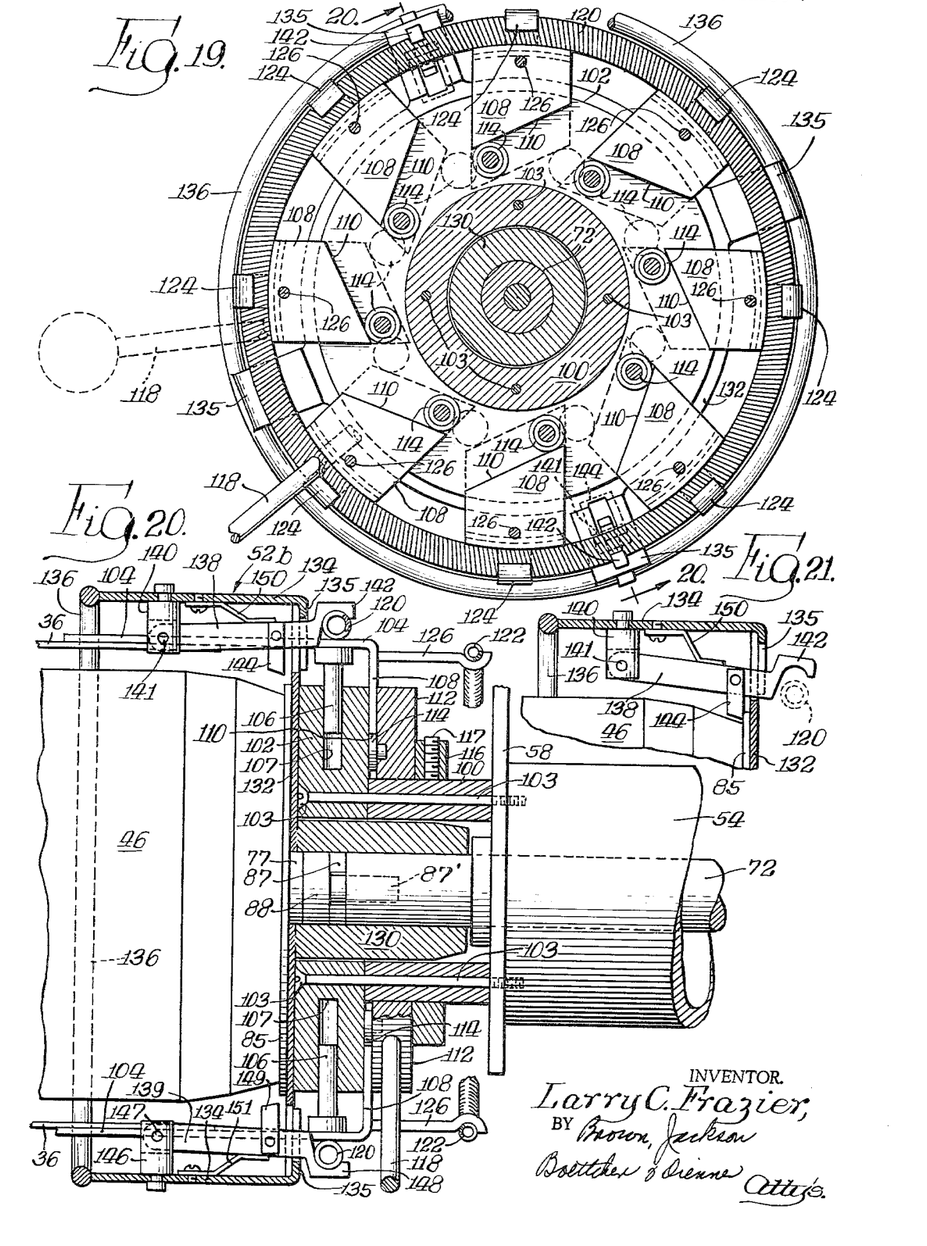
FIGURE 19 is a vertical section taken substantially along the line 19—19 of FIGURE 18.
FIGURE 20 is a longitudinal section taken substantially along the line 20—20 of FIGURE 19.
FIGURE 21 is a fragmentary vertical section showing an alternate position of the apparatus of FIGURE 20 wherein the pusher ring assembly is released from the band applier member and is secured to the end of the tire building bag.

Referring to FIGURES 18–21, there is shown the cylinder 54 and the piston rod 72 which were described hereinabove in conjunction with FIGURE 3, and as shown in FIGURE 20, the rod 72 is axially secured to the rod 77 whereby the cylinder 54 and the various components of the band applier 34 which are secured to the cylinder may be moved axially by conducting fluid under pressure thereto. A tubular hub 100 is assembled directly to the end of the cylinder 54, and a fin supporting ring 102 is positioned adjacent the outer or left hand end of the hub, both the ring 102 and the hub 100 being secured to the cylinder 54 by a plurality of mounting screws 103 which are threaded into the cylinder.

The plurality of steel fins 36 are supported by the ring 102 in such a manner as to be movable radially between expanded and retracted positions, the fins being circumferentially spaced around the ring. As shown in FIGURE 20, each fin 36 is connected to a corresponding fin base 104 having secured thereto a radial rod 106 which is received in a bore 107 in the supporting ring 102 for radial sliding movement therein. Each fin base portion 104 is bent at its rear end to form a radially inwardly directed portion 108, the end of the latter being cut along an incline to form a bevel or cam surface 110 (see FIGURE 19).

The mechanism for expanding and retracting the fins 36 will now be described. There is provided a ring-shaped collar 112 having secured thereto a plurality of thin rollers 114. As best shown in FIGURE 19, the rollers 114 are mounted at the front face of the collar and are arranged in a circle in uniformly spaced fashion with one roller being provided for each of the fin bases 104. The collar 112 is rotatably mounted on the hub 100 and is positioned immediately adjacent the radially inward extensions 108 of the fin bases 104, whereby the rollers 114 are arranged to bear against the cam surfaces 110, respectively. A collar 116 is mounted on the hub 100 adjacent the collar 112 and is held in position by a set screw 117, whereby the collar 116 will serve to maintain the collar 112 in its proper axial position while permitting it to rotate on the hub. A handle 118 is affixed to the collar 112 to permit manual rotation of the latter.

It will now be understood that when the collar 112 is rotated so as to bring the rollers 114 into the position shown in solid lines in FIGURE 19, the rollers will act on the cam surfaces 110 to move the fin bases 104 and the fins 36 to their radially expanded positions. When the collar 112 is rotated to bring the rollers 114 to the positions shown in dash lines in FIGURE 19, the several fins 36 are moved to their radially inner or retracted positions by a pair of endless coil spring bands 120 and 122. The endless coil spring band 120 encircles the fin bases 104 and is held in proper position by a plurality of brackets 124 (shown best in FIGURE 18), one of which is mounted on each of the fin bases 104 by a corresponding screw 125, whereby the band 120 biases the fins 36 to their retracted positions. Each of the radially inwardly directed extensions 108 is also provided with a rearwardly extending spring supporting rod 126, and the second coil spring band 122 is mounted on the rods 126 so as to assist in moving the fins to retracted positions.

It will be seen from FIGURE 20 and the above description that the assembly of the steel fins 36 and the supporting structure therefor is mounted on the end of the cylinder 54 for axial movement therewith when fluid under pressure is conducted to one of the conduits 74 and 75 which communicate with the cylinder.

Referring to FIGURE 20, the pusher ring assembly 52b comprises a hub 130 which is slidably mounted on the piston rod 72 and adapted to be positioned inside of the hub 100 and collar 102. A plate 132 is attached to the end of the hub 130, and four axially disposed arms 134 (only two of which are shown in FIGURE 20) are mounted at the rim portion of the plate. The arms 134 are equally spaced and each has a radially inwardly bent portion 135 which is welded or otherwise secured to the rear face of the plate 132. A pusher ring 136 is secured to the axially outer ends of the arms 134 so as to be supported thereby. It will be seen that the pusher ring 136 encircles the fin bases 104, and that the arms 134 are spaced between adjacent pairs of fin bases (see FIGURE 18) with the portions 135 extending radially inwardly between the fin bases to connect with the plate 132.

A pair of spring-actuated levers 138 and 139 are mounted on the two oppositely disposed pusher ring supporting arms 134 shown in FIGURE 20. The upper supporting arm 134 is provided with a radially inwardly extending bracket 140 (see FIGURE 20) on which the lever 138 is pivotally mounted by a pin 141. The axially inner end of the lever 138 is provided with a hook 142 which is adapted to hook over the endless coil spring band 120 when the latter is in its expanded position. A pin 144 is fixedly secured to the lever 138 intermediate its ends and is positioned to extend radially inwardly whereby when the lever is pivoted inwardly the pin 144 will project behind or to the left of the plate 85 which is mounted on the end of the piston rod 77 and sealed to the end of the inflatable bag 46.

The lower lever 139 is mounted on a bracket 146 by a pivot pin 147, and is similarly provided with a hooked end portion 148 adapted to hook over the coil band 120, and a radial pin 149 secured to the lever 139 is also adapted to project behind the rim of the plate 85. The two levers 138 and 139 are biased radially inwardly by a pair of leaf springs 150 and 151 which are fixed to the supporting arms 134. In this manner, the pusher ring assembly 52b may be anchored to the inflatable bag assembly to be left thereon when the band applier 34 is telescoped over the bag 46 to transfer a band and bead assembly thereto.

The pusher ring assembly 52b is at all times mounted on the piston rod 72, but it is free to slide axially thereon so as to assume different positions relative to the tire making apparatus. When the band applier 34 is telescoped over the building bag 46, the arm 118 is manually actuated so as to rotate the collar 112 and permit the endless coil spring bands 120 and 122 to retract the steel fins 36, whereby the band and bead ring assembly may be left on the building bag and the band applier backed away. It should be noted that when the coil spring band 120 retracts the steel fins 36, its diameter decreases so that it permits the levers 138 and 139 to swing radially inwardly (as shown in FIGURE 21) whereby the pins 144 and 149 project beyond the rim of the plate 85 to prevent the pusher ring assembly from being removed from the building bag when the band applier is backed away.

Furthermore, it will be seen that the coil spring band 120 contracts sufficiently so that it is able to clear the hooked ends 142 and 148 on the levers 138 and 139. It will also be understood that when the band applier 34 is subsequently again telescoped over the building bag 46 and the steel fins 36 expanded to pick up a finished tire, the expansion of the band 120 will move the levers 138 and 139 outwardly to the positions shown in FIGURE 20, whereby the pusher ring assembly will be removed from the building bag along with the finished tire. The latter operation will be described more fully hereinafter.

Figure 22:
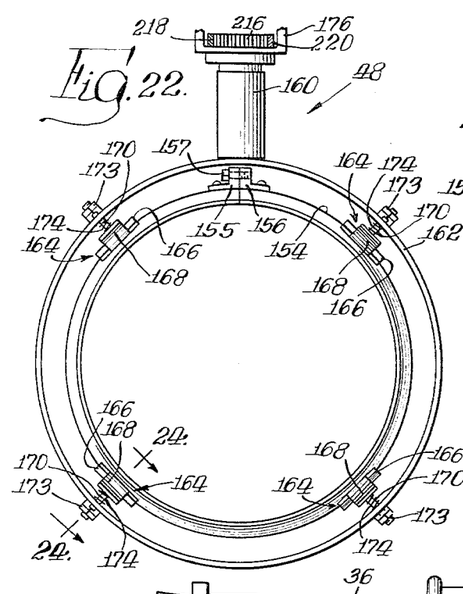
Figures 23, 24:
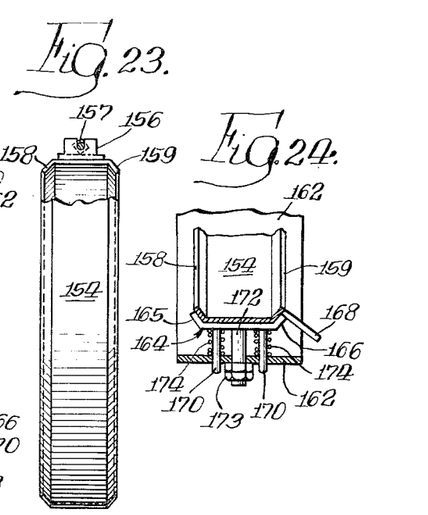
FIGURE 23 is a detail end elevational view of a split ring which comprises a component of the apparatus of FIGURE 22.
FIGURE 24 is a section taken substantially along the line 24—24 of FIGURE 22.

Referring now to FIGURES 22–24, as previously described herein, a tire is formed by inflating the bag 46 so as to expand the band 32 and form an intermediate torus section which is expanded radially outwardly into a surrounding tire tread element which is supported from a tread carrier assembly 48. The tread element itself can be built up on a conventional pulley type drum, and after being constructed a split ring 154 is slipped over the tread and the ends of the ring are secured together. Brackets 155 and 156 are fixed to the adjacent ends of the split ring and a screw 157 is utilized to connect the brackets and thus fasten the split ring about the tread element. The annular side edges 158 and 159 of the split ring 154 are partially bent radially inwardly to assure proper gripping of a tread element.

The tread ring carries 48 includes a supporting shaft 160 from which a retainer 162 is suspended, the retainer comprising a ring-shaped member of a diameter larger than the split ring 154 so as to be adapted to house the latter. A plurality of spring actuated brackets 164 are mounted within the retainer 162 for the purpose of gripping a split ring which is inserted therein. As shown in FIGURE 24, each bracket 164 is formed with bent side portions 165 and 166 to correspond substantially to the inclination of the side edges of the split ring 154. The side portion 166 is also provided with an extending cam portion 168 to facilitate insertion of a split ring within the retainer.

The brackets 164 are also each provided with a pair of guide pins 170 which extend through corresponding holes in the retainer 162 and serve to guide the bracket while permitting it to move radially relative to the retainer 162. A rod 172 extends radially outwardly from the bracket so as to project through the wall of the retainer, and a nut 173 is threaded on the end of the rod so as to limit the radially inward movement of the bracket relative to the retainer. A pair of compression springs 174 are mounted on the pins 170 between the outer face of the bracket 164 and the inner wall of the retainer 162 and serve to yieldingly urge the bracket radially inwardly.

As shown in FIGURE 22, four brackets 164 are provided in the embodiment being described. It will thus be seen that a split ring 154 may be inserted in the retainer 162 by urging the same against the cam surfaces 168 so as to snap the split ring into the position shown in FIGURE 24, wherein it will be held by the spring actuated brackets 164 and yet be allowed to conform to the inflated ply 32 during formation of a tire. It will also be understood that when a tire is formed and it is desired to remove the same from the retainer 162, the split ring 154 with a completed tire enclosed therein may be pulled axially out of the retainer by simply overcoming the spring pressure produced by the springs 174.

A sequence of operations for the tire making apparatus of the present invention will now be described. It will be assumed that a band 32 and a pair of bead rings 44a and 44b have been positioned on the steel fins 36 in the manner previously described, and that the band applier 34 has been rotated by conducting fluid under pressure to the conduit 92 to bring the rod 72 into axial alignment with the tire building bag 46 and engage the end of the rod 72 with the keeper 87. The various components of the apparatus will thus be in the positions shown in FIGURE 3 at the beginning of a tire making cycle.

It will be seen from FIGURE 3 that the tread retainer 162 is positioned over the building bag 46 at the right hand end of the latter. The shaft 160 which supports the retainer is supported from a tread carriage 176 which is provided with a pair of rollers 177 and 178 so as to be adapted to ride along the rail 68. FIGURE 25 is a partially schematic view showing the manner in which a cable 180 is secured to the carriage 176 and passed over a pulley 182, a weight 183 being secured to the end of the cable and associated with a dash pot 184 so as to bias the carriage 176 to its right hand position as shown in FIGURE 3. A stop 186 (see FIGURE 12) is provided on the rail 68 to prevent the weight and cable mechanism from moving the carriage beyond the position of FIGURE 3.

In order to transfer the band 32 and bead rings 44a and 44b to the building bag 46, fluid under pressure is conducted to the cylinder 54 through the conduit 74. The piston rod 72 is axially secured to the keeper 87 on the rod 77 and thus remains stationary while the cylinder 54 moves toward the building bag 46 to the position shown in FIGURE 4. It will be seen that the carriage 64 from which the band applier 34 is supported will ride along the rail 68 to the position of FIGURE 4, and when the cylinder 54 has reached the end of its travel the steel fins 36 with the band and bead ring assembly thereon will be telescoped over the building bag 46 and will be positioned with the left hand bead ring 44a slightly to the left of hooks 188 provided at the ends of a plurality of band positioning arms 190 which are mounted on the cylinder support head 83, as will be described more fully hereinafter. The band positioning arms 190 serve as a means for locating the band 32 and the bead rings 44a and 44b relative to the building bag 46, and also serve to retain the band and bead ring assembly on the building bag when the band applier 34 is backed away.

Figure 4:
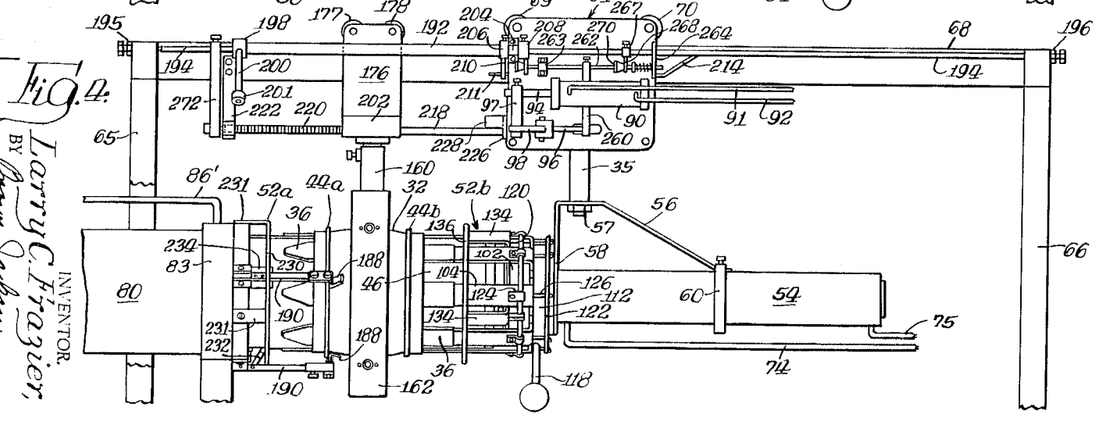
FIGURE 4 is a view similar to FIGURE 3 showing the band applier telescoped over the tire building bag, and showing the other related components of the apparatus in their corresponding positions.

When the band applier 34 is moved from the position of FIGURE 3 to the position of FIGURE 4, the tread unit carriage 176 is also moved along the rail 68 so as to center the tread retainer 162 with respect to the building bag 46. The mechanism for positioning the tread carriage 176 comprises a tubular member 192 which is slidably mounted so as to float on a rod 194. The rod 194 has one end mounted at the upper end of the supporting frame 65 and its other end mounted at the upper end of the supporting frame 66 in such a manner that the rod 194 is free to rotate but is axially fixed relative to the supporting structure by means of a pair of nuts 195 and 196.

The tubular member 192 is free to rotate and slide axially on the rod 194, and when positioned as in FIGURE 3 it extends between the band applier carriage 64 and the tread unit carriage 176. A collar 198 is fixed to the left hand end of the tube 192 and a pusher rod 200 extends downwardly from the collar and has a roller 201 mounted at its lower end for cooperation with a pusher plate 202 on the carriage 176. The right hand end of tube 192 extends through a bracket 204 on the band applier carriage 64 and a pair of collars 206 and 208 are secured to the tube, one on each side of the bracket 204. It will thus be understood that the tube 192 is free to rotate on the rod 194, but is permitted to move axially along the rod only when the carriage 64 is moved.

Figures 12, 13, 14:
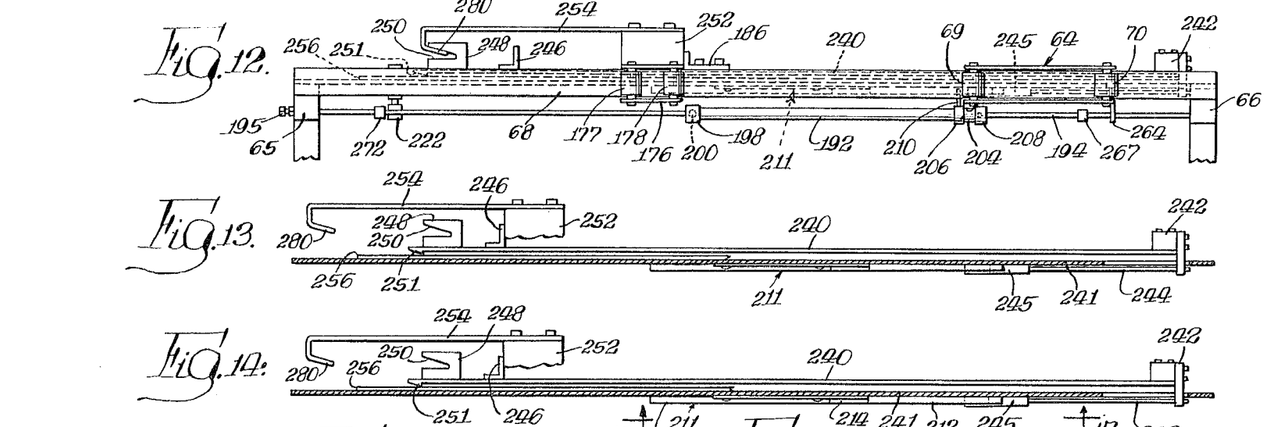
FIGURE 12 is a fragmentary plan view of cam positioning apparatus associated with the tread carrier of the tire building machine and utilized to actuate means for controlling the movement of the tread carrier during a tire making cycle, the apparatus being shown in the position it assumes when the tire building machine is positioned as in FIGURE 3.
FIGURE 13 is a view similar to FIGURE 12, certain components being removed for purposes of clarity, showing the cam positioning apparatus in the position it assumes when the tire building machine is positioned as in FIGURE 4.
FIGURE 14 is a view substantially identical to FIGURE 13 showing the cam positioning apparatus in the position it assumes when the tire building machine is positioned as in FIGURE 5.

As shown in plan in FIGURE 12, the collar 206 is provided with a horizontal pin 210 which projects into the paper in FIGURE 3 and is adapted to cooperate with a stationary cam track 211. In the position shown in FIGURE 3, the pin 210 is engaged against the underside of an upper horizontal portion 212 of the cam track, the pin being maintained in engagement with the track due to the gravity weight of the pusher rod 200. As the band applier carriage 64 slides along the rail 68 toward the position of FIGURE 4, the tube 192 is moved along the rod 194 a similar distance, and the roller 201 on the rod 200 pushes against the pusher plate 202 so as to move the tread carriage 176 to the left along the rail 68.

Figures 9, 10, 11:
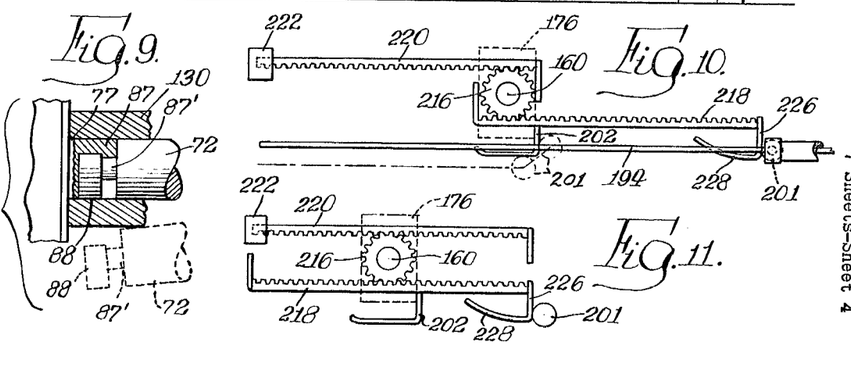
FIGURE 9 is a section taken substantially along the line 9—9 of FIGURE 8.
FIGURE 10 is a detail plan view of a rack and pinion mechanism for controlling the position of a tread carrier which forms a component of the tire building machine.
FIGURE 11 is a view similar to FIGURE 10 showing the rack and pinion mechanism in an alternate position subsequent to inflation of the building bag to form a tire.

When the tread carriage 176 reaches the position shown in FIGURE 4 wherein it is centered with respect to the building bag 46, the pin 210 rides downwardly along an inclined portion 214 of the cam track, whereby the tube 192 is rotated on the rod 194 and the roller 201 is deflected out of the paper as shown in FIGURE 4 so as to move around the pusher plate 202 (see FIGURE 10).

Figures 15, 17:
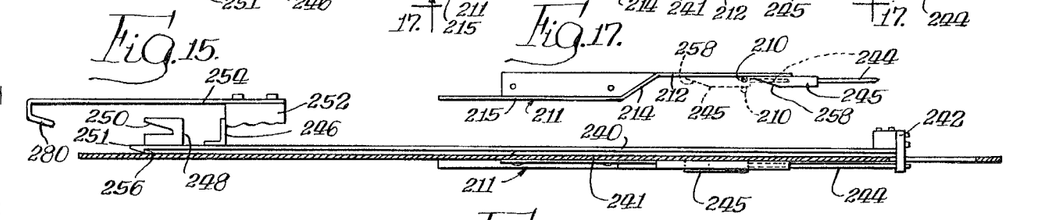
FIGURE 15 is a plan view showing the cam positioning apparatus in the position it assumes when the tire building machine is positioned as in FIGURE 6.
FIGURE 17 is a partial elevation taken substantially along the line 17—17 of FIGURE 14.

Thus, the pusher rod 200 moves the tread carriage 176 to the centered position of FIGURE 4 and then moves around it, after which the pusher rod continues to move to the left to the position shown in FIGURE 4, and it remains in its deflected position since the pin 210 will at this time be engaged against the underside of a lower horizontal track portion 215 (see FIGURE 17).

Referring to FIGURES 3, 10 and 11, as stated hereinabove the tread retainer 162 is supported from a shaft 160 which in turn is supported from the carriage 176. At the upper end of the shaft 160 there is mounted thereon a pinion 216 which is positioned between two rack members 218 and 220, both of which are mounted on the carriage 176. A rack catcher 222 (see FIGURE 26) is secured to the side of the rail 68 near the left end thereof, and the catcher has an opening 223 adjacent which there is provided a spring loaded blade 224. The opening 223 is located so that when the tread carriage 176 is moved to the position of FIGURE 4, the end of the rack 220 will project into the opening and be held by the blade 224, whereby the tread retainer 162 will be maintained in a centered position relative to the building bag 46.

During the foregoing operations the arm 118 on the band applier 34 is in its downward position, as shown in solid lines in FIGURE 19, so as to maintain the steel fins 36 in their expanded positions and thus exert a pressure on the band 32 to hold it on the fins. Having positioned the band 32 over the building bag 46 as in FIGURE 4, the arm 118 is then manually moved to its upper position to relax the fins 36, after which fluid under pressure is conducted to cylinder 54 through conduit 75 to return the band applier 34 to its original position as shown in FIGURE 5.

It will be noted that when the band applier 34 is returned to its original position, band 32 and bead rings 44a and 44b remain on the building bag 46. As the steel fins 36 move to the right from the position of FIGURE 4, there is a tendency due to friction for the band 32 to move therewith, but as soon as the left hand bead ring 44a engages against the hooks 188 on the band positioning arms 190, the band and bead ring assembly is held in position permitting the relaxed fins 36 to be withdrawn therefrom. The pusher ring assembly 52b will also remain on the end of the building bag due to the pins 144 and 149 (see FIGURE 20) which are moved behind the plate 85 when the steel fins are relaxed, as explained earlier herein.

The tube 192 is returned to its original position along with the band applier carriage 64, and due to the fact that the tread carriage 176 is now centered with respect to the building bag 46, the roller 201 on rod 200 is positioned immediately to the right of a pusher plate 226 which is mounted on the right hand end of the rack 218. During the movement of the tube 192 from the position of FIGURE 4 to the position of FIGURE 5, the rod 200 and roller 201 are maintained in their deflected positions, due to the cooperation between the cam track 215 and the pin 210, until the roller 201 has moved past the pusher plate 202. The rod 200 drops back down to its vertical pushing position prior to passing the pusher plate 226, but it will be noted from FIGURE 10 that there is a cam portion 228 provided on the plate 226 which deflects the roller 201 around the plate 226 and permits it to drop into pushing position immediately to the right thereof as shown in FIGURE 5.

Figure 5:
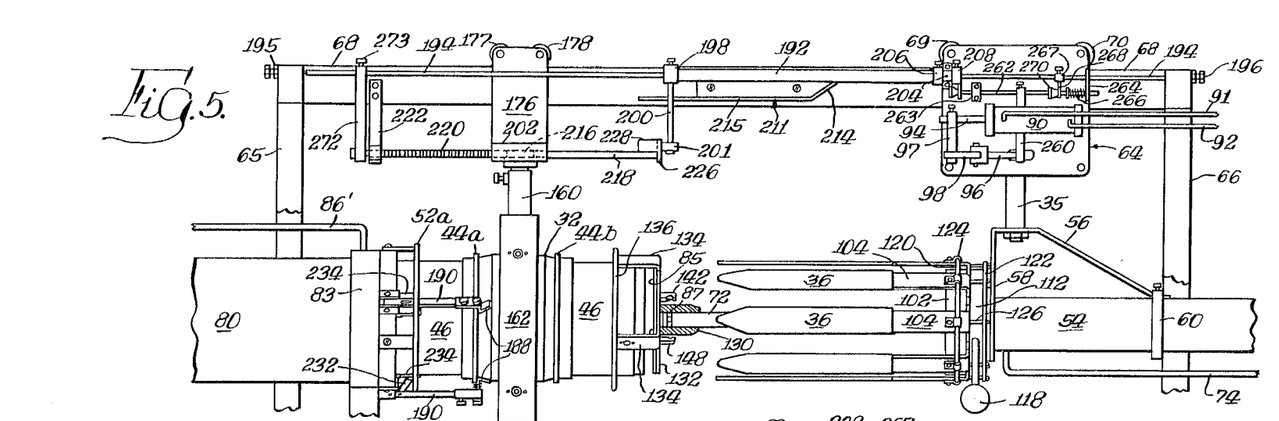
FIGURE 5 is a side elevational view showing the apparatus of FIGURE 3 after the band and bead ring assembly and also a pusher ring member have been deposited on the tire building bag and the band applier member has been backed away from the building bag.

With the apparatus in the position shown in FIGURE 5, fluid under pressure is conducted to the cylinder 80 through the conduit 86' so as to move the rod 77 to the left and thereby axially contract the building bag 46. At the same time fluid under pressure is supplied to the interior of the bag 46 to inflate the same and effect the formation of a tire. As previously described herein, the inflation of the bag 46, which is confined by the inextensible bead rings 44a and 44b, will expand different sections of a tire carcass so as to produce an intermediate torus section and two annular sections one at each end of the intermediate section separated by the pair of bead rings, whereby the carcass fabric is automatically folded about the bead rings and the latter are thus anchored in the carcass.

During the inflation of the building bag 46, the pusher ring assembly 52b which is secured at the right end of the building bag is moved axially toward the pusher ring assembly 52a which is fixedly mounted at the cylinder head plate 83. The pusher ring assembly 52a comprises a ring 230 secured at the outer ends of a plurality of circumferentially spaced arms 231 which are mounted on the cylinder head plate. The pusher rings 136 and 230 press the inflated end sections of the building bag 46 toward one another and against the intermediate section with sufficient pressure to insure proper sealing contact of the component parts of the carcass side walls, and thus seal and wrap the end portions of the ply 32 tightly around the bead rings.

Figure 6:
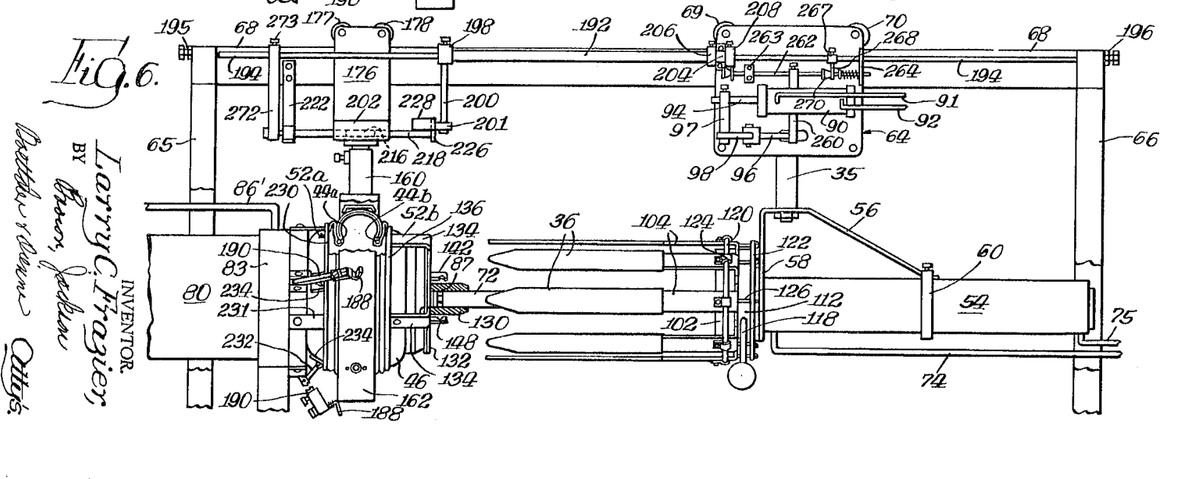
FIGURE 6 is a side elevational view showing the apparatus of FIGURE 3 after the tire building bag has been inflated to form a tire.

Referring to FIGURES 5 and 6, it will be noted that the band positioning arms 190 are pivotally mounted at the cylinder head 83. Each arm 190 has a link 232 secured thereto, and at the end of each such link a paddle 234 is provided which bears against the surface of the bag 46. Accordingly, when the building bag is inflated, the paddles 234 are moved radially outwardly causing the positioning arms 190 which are biased radially inwardly by spring means (not shown) to be pivoted outwardly to the positions shown in FIGURE 6, wherein they will not interfere with the movement of the tread retainer 162 which will not be described.

When the plate 85 and the right end of the building bag 46 are moved to the left upon conducting fluid under pressure through the conduit 86', the entire band applier assembly 34 is pulled to the left a corresponding distance due to the fact that the rod 72 is axially secured to the keeper 87 on the rod 77. When the band applier carriage 64 moves to the left, it will again move the tube 192 along the rod 104. Since the pusher rod 200 and roller 201 are positioned immediately to the right of pusher plate 226, the roller 201 will push the plate 226 and thus, move the rack 218 a distance corresponding to the movement of the right end of the building bag 46. Referring to FIGURES 10 and 11, the rack 220 is held stationary by the rack catcher 222, and the movement of the rack 218 will thus act upon the pinion 216 to move the tread carriage 176 a distance equal to one half the movement of the end of the building bag. In this manner, the tread retainer 162 is maintained centered over the building bag. It will thus be understood that FIGURE 10 shows the position of the rack and pinion mechanism when the tire building apparatus is in the position shown in FIGURE 5, and FIGURE 11 shows the position of the rack and pinion mechanism after a tire has been formed and the tire building apparatus has moved to the position shown in FIGURE 6.

Before describing the step of removing the completed tire from the building bag 46, I shall describe certain additional mechanism for controlling the position of the pusher rod 200 and roller 201. FIGURES 12 and 13 are plan views showing a rod 240 which as shown in FIGURE 12 is positioned underneath the rail 68 and extends the major portion of the length thereof. The right end of the rod 240 is secured to a mounting bracket 242, and a second shorter rod 244 projects axially to the left from the bracket 242 and carries on the end thereof a cam 245. A bracket 246 is secured to the rod 240 near the left end thereof, and at the extreme left end of the rod there is provided a plate 248 having an inclined slot 250 formed therein. The left hand end of the rod 240 is also provided with a hook or catch 251.

The rod 240 and bracket 242 are adapted to be moved axially along a supporting member 241 between the position shown in FIGURE 13 and the position shown in FIGURE 15, the object being to move the cam 245 between its normal inoperative position of FIGURE 13 and its operative position of FIGURE 15 wherein it is adapted to cooperate with the pin 210 (see FIGURE 12) which projects from the collar 206 on the tube 192, as will be more fully described hereinafter. FIGURE 12 shows a plate 252 and an arm 254 which are secured to the side of the tread carriage 176 for the purpose of actuating the rod 240 upon movement of the tread carriage.

When the tire building apparatus is in the position shown in FIGURE 3, the rod 240 will be in its right hand position as shown in FIGURE 12, and in this position the cam 245 will be positioned slightly to the right of the collar 206 so as not to interfere with the pin 210 which projects from the collar. When the tread carriage 176 is moved to the position of FIGURE 4 so as to be centered with respect to the building bag, the plate 252 will be moved to a position adjacent the bracket 246 on the rod 240 as shown in FIGURE 13, but the rod will not be moved at this time.

FIGURE 14 corresponds to FIGURE 5 and it will be understood that when the band applier 34 is moved away from the building bag to the position of FIGURE 5, the tread carriage 176 remains stationary as does the rod 240.

During the formation of a tire, the tread carriage 176 is moved further to the left to the position shown in FIGURE 6, whereby the plate 252 pushes the bracket 246 and moves the rod 240 to its left hand position wherein the catch 251 drops over a fixed shoulder 256 so as to maintain the rod 240 in its left hand position. In this manner, the cam 245 is moved out to the position shown in FIGURE 15 wherein it will act on the pin 210 in a manner to be described. FIGURE 17 is an elevational view showing in solid lines the cam 245 in the position corresponding to FIGURE 14, and showing in dash lines the cam in the position corresponding to FIGURE 15. It will be noted that the cam 245 is provided with an inclined surface 258 for cooperation with the pin 210.

Figure 7:
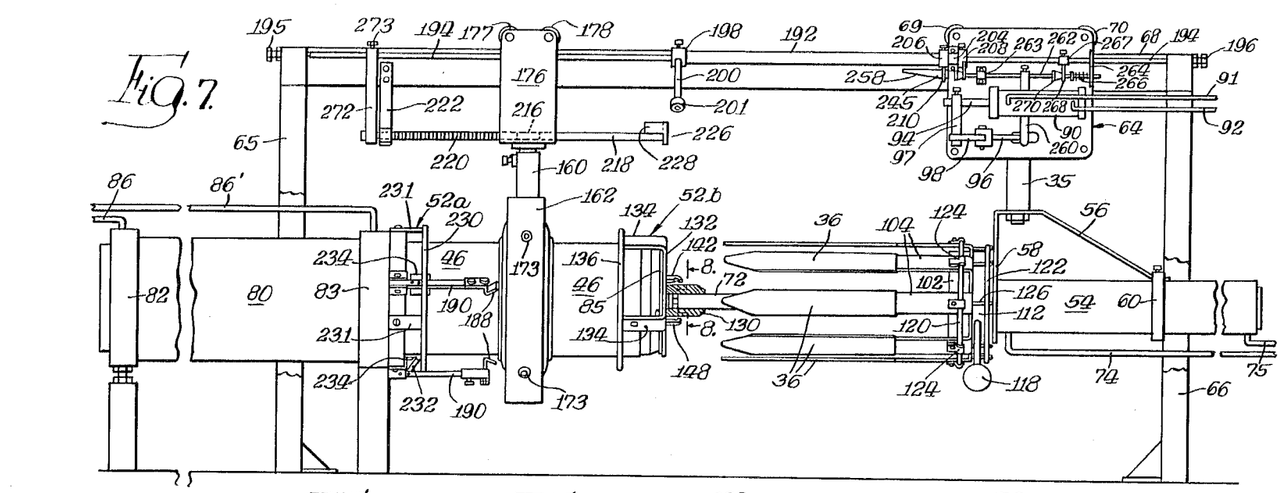
FIGURE 7 is a side elevation showing the tire building bag deflated subsequent to formation of a tire, and showing the other elements of the apparatus in their corresponding relative positions.

Referring again to FIGURE 6, when the formation of the tire is completed, the building bag 46 is deflated and fluid under pressure is conducted to cylinder 80 through conduit 86 (see FIGURE 3) to move the piston 77 outwardly and elongate the building bag so as to move the mechanism to the position shown in FIGURE 7. It will be seen that through its connection with the keeper 87, the rod 72 is moved to the right thus moving the entire band applier assembly 34 to the right hand position shown in FIGURE 7. During movement of the band applier carriage 64 from the position of FIGURE 6 to the position of FIGURE 7, the tube 192 is moved along the rod 194. Since the cam 245 is now in the position shown in dash lines in FIGURE 17, the pin 210 will be caused to ride down the inclined cam surface 258 thus rotating the tube 192 and causing the rod 200 and roller 201 to be deflected out of the paper to the position shown in FIGURE 7.

The next step in the cycle is to again move the band applier 34 over the building bag for the purpose of removing both the finished tire and the pusher ring assembly 52b from the building bag. The object in providing the cam 245 for deflecting the rod 200 and roller 201 to the position shown in FIGURE 7 is so that when the band applier is moved inwardly to pick up the tire, the pusher roller 201 will be deflected long enough to move past the pusher plate 226 on rack 218 so as not to disturb the position of the tread carriage 176, the latter having returned to a centered position relative to the elongated building bag.

The steel fins 36 are again moved over the building bag 46 by conducting fluid under pressure to the cylinder 54 through the conduit 74 so as to move the band applier 34 toward the building bag. In this instance, the steel fins move over the building bag and under the tire beads 44a and 44b to a position substantially as shown in FIGURE 4, except there is now a completed tire on the fins.

The fins 36 are then expanded by moving the arm 118 to its lower position as shown in solid lines in FIGURE 19, so as to grip the bead rings and also move the levers 138 and 139 to their outer positions as shown in FIGURE 20. In this manner, the pins 144 and 149 are lifted from behind the plate 85 and the hooks 142 and 148 on the levers 138 and 139 are engaged on the expanded endless coil spring band 120, whereby when the band applier 34 is moved away from the building bag, both the tire and the pusher ring assembly 52b will be removed therewith.

Fluid under pressure is next conducted to cylinder 54 through conduit 75 to return the apparatus substantially to the position of FIGURE 7, except of course in the present instance a completed tire will be mounted on the fins 36, and the pusher ring assembly will be at the right hand end of the rod 72 (as in FIGURE 3). It should be noted that when the fins are moved away from the building bag, the grip they exert on the bead rings 44a and 44b is sufficient to pull the tire and the split ring 154 out of the retainer 162. In other words, with reference to FIGURES 22–24, the brackets 164 are moved radially outwardly against the pressure of the springs 174 so that the tire with the split ring 164 mounted thereon is pulled out of the retainer.

Fluid under pressure is next conducted to cylinder 90 through conduit 91 so as to move the piston rod 94 to the position shown in solid lines in FIGURE 2 and thereby swing the band applier assembly 34 out to the position shown in solid lines in FIGURE 1 so as to align it with the band building apparatus 30 and the bead placing apparatus 38. The fins 36 are then relaxed by moving the arm 118 to its upper position as shown in dash lines in FIGURE 19, after which the completed tire is removed from the fins.

Referring to FIGURE 2, it will be seen that when the band applier is swung outwardly as described above, the link 96 is rotated from the position shown in dash lines to the position shown in solid lines. Referring now to FIGURE 7, when the link 96 is thus rotated it engages a vertically disposed rod 260. The rod 260 is fixedly mounted on a horizontal rod 262 which is mounted in a pair of brackets 263 and 264 which are secured to the band applier carriage 64. The rod 262 is adapted to slide horizontally in the brackets 263 and 264, and when the link 96 rotates and engages the vertical rod 260, the latter is moved to the right so as to slide the rod 262 to the right against the force of a compression spring 266 which normally maintains the rod 262 in its left hand position. A collar 267 is fixed to the long horizontal rod 194, and a pin 268 projects downwardly from the collar for cooperation with a conical member 270 carried by the rod 262. Accordingly, when the rod 262 is moved to the right, the conical member 270 engages the pin 268 and rotates the rod 194, such rotation being in a clockwise direction as viewed in FIGURE 26.

Referring to FIGURES 7 and 26, a lever 272 is mounted on the rod 192 immediately to the left of the rack catcher 222, and is held thereon by a set screw 273. At the lower end of the lever 272 there is secured a rod 274 which projects through the catcher 222 and is provided with a head 275 at its outer end. A compression spring 276 is mounted on the rod 274 between the catcher 222 and the head 275 to bias the rod to the right as shown in FIGURE 26. As described earlier herein, the end of the rack 220 is held in the catcher by means of the movable blade 224 which is adapted to project between the teeth on the rack to lock the latter in position. The rod 274 is connected to the blade 224, whereby upon rotation of the rod 194 in a clockwise direction the lower end of the lever 272 will be swung to the left pulling the rod 274 therewith and thereby moving the blade 224 away from the opening 223 so as to release the rack 220. It will now be understood that when fluid under pressure is conducted to cylinder 90 to move the band applier 34 to the position shown in solid lines in FIGURE 1, the rod 194 is rotated to cause the release of the rack 220 from the catcher 222.

Figure 16:
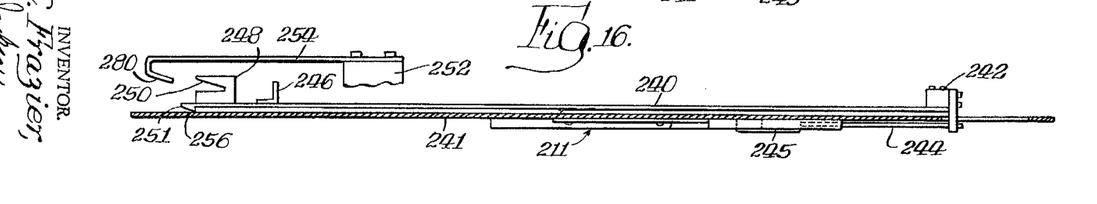
FIGURE 16 is a plan view showing the cam positioning apparatus in the position it assumes when the tire building machine is positioned as in FIGURE 7.
Figure 18:
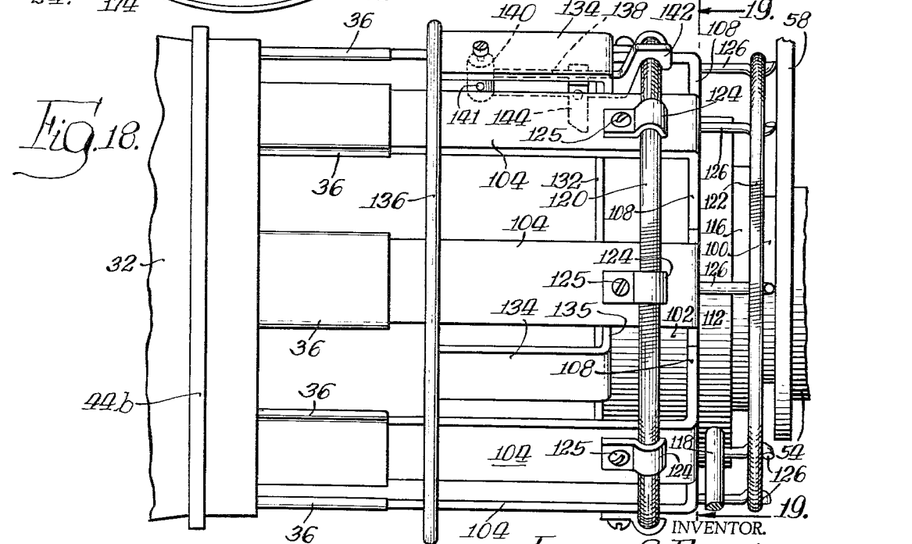
FIGURE 18 is an enlarged fragmentary side elevational view illustrating a pusher ring assembly and the manner in which it is releasably secured to the band applier assembly.

Upon release of the rack 220, the tread carriage return mechanism (see FIGURE 25) will return the tread carriage 176 to the position shown in FIGURE 3 where it will engage the stop 186 (see FIGURE 12). Referring to FIGURE 16, when the carriage 176 is returned to its original position, the plate 252 which is secured to the carriage will be moved a similar distance causing a hook 280 on the end of the arm 254 to enter the slot 250 in the bracket 248 so as to lift the catch 251 away from the shoulder 256 and pull the rod 240 back to the position shown in FIGURE 12. In this manner, the cam 245 is returned to its inoperative position as shown in solid lines in FIGURE 17, and the tube 192 is permitted to rotate to bring the pusher rod 200 back into its vertical position in preparation for the next cycle.

It will be understood that various modifications and rearrangements may be made in the embodiments selected for disclosing my invention without departing from the spirit and scope of my invention.

I claim:

1. In a tire building machine, in combination, an expandable tire building drum adapted to expand a fabric band and bead ring assembly to form a tire, band applier means including an expandable generally drum-like member having a diameter greater than said building drum and adapted to have a cylindrical fabric band and bead ring assembly mounted thereon, means for controlling the expansion and contraction of said band applier to effect the gripping and release of a fabric band mounted thereon, means for moving said band applier axially toward said building drum so as to cause said band applier and a band and bead ring assembly mounted thereon to be telescoped over said building drum and for subsequently moving said band applier axially away from said building drum whereby said band and bead ring assembly will be deposited on said building drum, and band positioning means adapted to engage a bead ring on said band so as to retain said band and bead ring assembly in proper position on said building drum when said band applier is moved axially away from said building drum.

2. The combination of claim 1 wherein said band positioning means is pivotally mounted so as to be adapted to be moved radially outwardly when said building drum is expanded to form a tire.

3. In a tire building machine, in combination, an inflatable tire building bag adapted to be expanded radially and contracted axially to expand a fabric band to form a tire, band applier means including a generally drum-like member having a diameter greater than said building bag and adapted to have a cylindrical fabric band mounted thereon, a pusher ring assembly for aiding in the formation of a tire during axial contraction of said building bag, releasable means for securing said pusher ring assembly to said band applier, means for moving said band applier axially toward said building bag so as to cause said band applier and a fabric band mounted thereon to be telescoped over said building bag and for subsequently moving said band applier axially away from said building bag whereby said band will be deposited on said building bag, and means adapted to be operated when said band applier is in telescoped position over said building bag for releasing said pusher ring assembly from said band applier so as to permit said pusher ring assembly to remain in operative relation with said building bag when said band applier is moved axially away therefrom.

4. In a tire building machine, in combination, an inflatable tire building bag adapted to be expanded radially and contracted axially to expand a fabric band to form a tire, band applier means including an expandable generally drum-like member having a diameter greater than said building bag and adapted to have a cylindrical fabric band mounted thereon, means for controlling the expansion and contraction of said band applier to effect the gripping and release of a fabric band mounted thereon, a pusher ring assembly for aiding in the formation of a tire during axial contraction of said building bag, releasable means for securing said pusher ring assembly to said band applier, means for moving said band applier axially toward said building bag so as to cause said band applier and a fabric band mounted thereon to be telescoped over said building bag and for subsequently moving said band applier axially away from said building bag whereby said band will be deposited on said building bag, said releasable means being adapted to be actuated to release position when said band applier is in telescoped position over said building bag for releasing said pusher ring assembly from said band applier so as to permit said pusher ring assembly to remain in operative relation with said building bag when said band applier is moved axially away therefrom.

5. The combination of claim 4 wherein said releasable means is actuated to released position in response to the retraction of said band applier and wherein means responsive to the retraction of said band applier are provided to secure said pusher ring assembly to the end of said building bag whereby when said band applier is retracted to release said band said pusher ring assembly will be disengaged from the band applier and secured to the end of the building bag.

6. In a tire building machine, in combination, an inflatable tire building bag adapted to be expanded radially and contracted axially to expand a fabric band to form a tire, a tread retainer positioned so as to encircle said bag and adapted to move axially relative to said bag, band applier means including a generally drum-like member having a diameter greater than said building bag and less than said tread retainer and adapted to have a cylindrical fabric band mounted thereon, means for moving said band applier axially toward said building bag so as to cause said band applier and a fabric band mounted thereon to be telescoped over said building bag and for subsequently moving said band applier axially away from said building bag whereby said band will be deposited on said building bag, and pusher means actuated by said band applier to move said tread retainer to an axially centered position relative to said building bag when said band applier is moved axially toward said building bag.

7. The combination of claim 6 including rack and pinion means associated with said tread retainer and adapted to be actuated by said pusher means to maintain said tread retainer in axially centered relation to said building bag when the latter is axially contracted to form a tire.

8. In a tire building machine, in combination, an expandable tire building drum adapted to expand a fabric band to form a tire, band applier means including a generally drum-like member having a diameter greater than said building drum and adapted to have a cylindrical fabric band mounted thereon, and means for moving said band applier axially toward said building drum so as to cause said band applier and a fabric band mounted thereon to be telescoped over said building drum and for subsequently moving said band applier axially away from said building drum whereby said band will be deposited on said building drum, said moving means also being adapted to move said band applier over said building drum subsequent to the formation of a tire on said building drum whereby said band applier may be utilized to remove a finished tire from said building drum.

9. In a tire building machine, in combination, an expandable tire building drum adapted to expand a fabric band to form a tire, band applier means including an expandable generally drum-like member having a diameter greater than said building drum and adapted to have a cylindrical fabric band and a finished tire alternately mounted thereon, means for controlling the expansion and contraction of said band applier to effect the gripping and release of a fabric band or finished tire mounted thereon, and means for moving said band applier axially toward said building drum so as to cause said band applier and a fabric band mounted thereon to be telescoped over said building drum and for subsequently moving said band applier axially away from said building drum whereby said band will be deposited on said building drum, said moving means also being adapted to move said band applier over said building drum subsequent to the formation of a tire on said building drum whereby said band applier may be utilized to remove a finished tire from said building drum.

10. The combination of claim 9 together with ring means for holding a tire tread element and a tread retainer having yieldable means for holding said ring means and said tire tread element whereby said fabric band may be expanded into said tread element to form a tire and said tire and said ring means may be removed together from said retainer by said band applier upon application of sufficient axial force to overcome said yieldable means.

11. In a tire building machine, in combination, an inflatable tire building bag adapted to be expanded radially and contracted axially to expand a fabric band to form a tire, band applier means including a generally drum-like member having a diameter greater than said building bag and adapted to have a cylindrical fabric band mounted thereon, a pusher ring assembly for aiding in the formation of a tire during axial contraction of the building bag, releasable means for securing said pusher ring assembly to said band applier, means for moving said band applier axially toward said building bag so as to cause said band applier and a fabric band mounted thereon to be telescoped over said building bag and for subsequently moving said band applier axially away from said building bag whereby said band will be deposited on said building bag, means adapted to be actuated when said band applier is in telescoped position over said building bag for releasing said pusher ring assembly from said band applier so as to permit said pusher ring assembly to remain in operative relation with said building bag when said band applier is moved axially away therefrom, said moving means also being adapted to move said band applier over said building bag subsequent to the formation of a tire on said building bag whereby said band applier may be utilized to simultaneously remove a finished tire and said pusher ring assembly from said building bag.

12. In a tire building machine, in combination, an inflatable tire building bag adapted to be expanded radially and contracted axially to expand a fabric band to form a tire, band applier means including an expandable generally drum-like member having a diameter greater than said building bag and adapted alternately to have a cylindrical fabric band and a finished tire mounted thereon, means for controlling the expansion and contraction of said band applier to effect the gripping and release of a fabric band or finished tire mounted thereon, a pusher ring assembly for aiding in the formation of a tire during axial contraction of said building bag, releasable means for securing said pusher ring assembly to said band applier, means for moving said band applier axially toward said building bag so as to cause said band applier and a fabric band mounted thereon to be telescoped over said building bag and for subsequently moving said band applier axially away from said building bag whereby said band will be deposited on said building bag, said releasable means being adapted to be actuated to released position in response to retraction of said band applier whereby when said band applier is in telescoped position over said building bag and is retracted to release said band said pusher ring assembly will also be released to permit said pusher ring assembly to remain in operative relation with said building bag when said band applier is moved axially away therefrom, said moving means also being adapted to move said band applier over said building bag subsequent to the formation of a tire on said building bag whereby said band applier may be utilized to simultaneously remove a finished tire and said pusher ring assembly from said building bag, and said releasable means being actuated to locked position in response to expansion of said band applier to grip a finished tire.

References Cited by the Examiner
UNITED STATES PATENTS

| | | | |
|---|---|---|---|
| 2,517,889 | 8/1950 | Kuffler | 156—126 |
| 2,614,951 | 10/1952 | Iredell | 156—403 X |
| 2,822,025 | 2/1958 | Hollis | 156—394 |
| 2,822,027 | 2/1958 | Hollis | 156—127 |
| 2,871,912 | 2/1959 | Kraft | 156—126 |
| 2,878,857 | 3/1959 | Smith et al. | 156—394 |
| 2,936,813 | 5/1960 | Haase | 156—126 |

ALEXANDER WYMAN, *Primary Examiner.*

HAROLD ANSHER, *Examiner.*